C. A. WOODS.
AUTOMOBILE POWER MOTOR.
APPLICATION FILED NOV. 27, 1909.
1,003,567.
Patented Sept. 19, 1911.
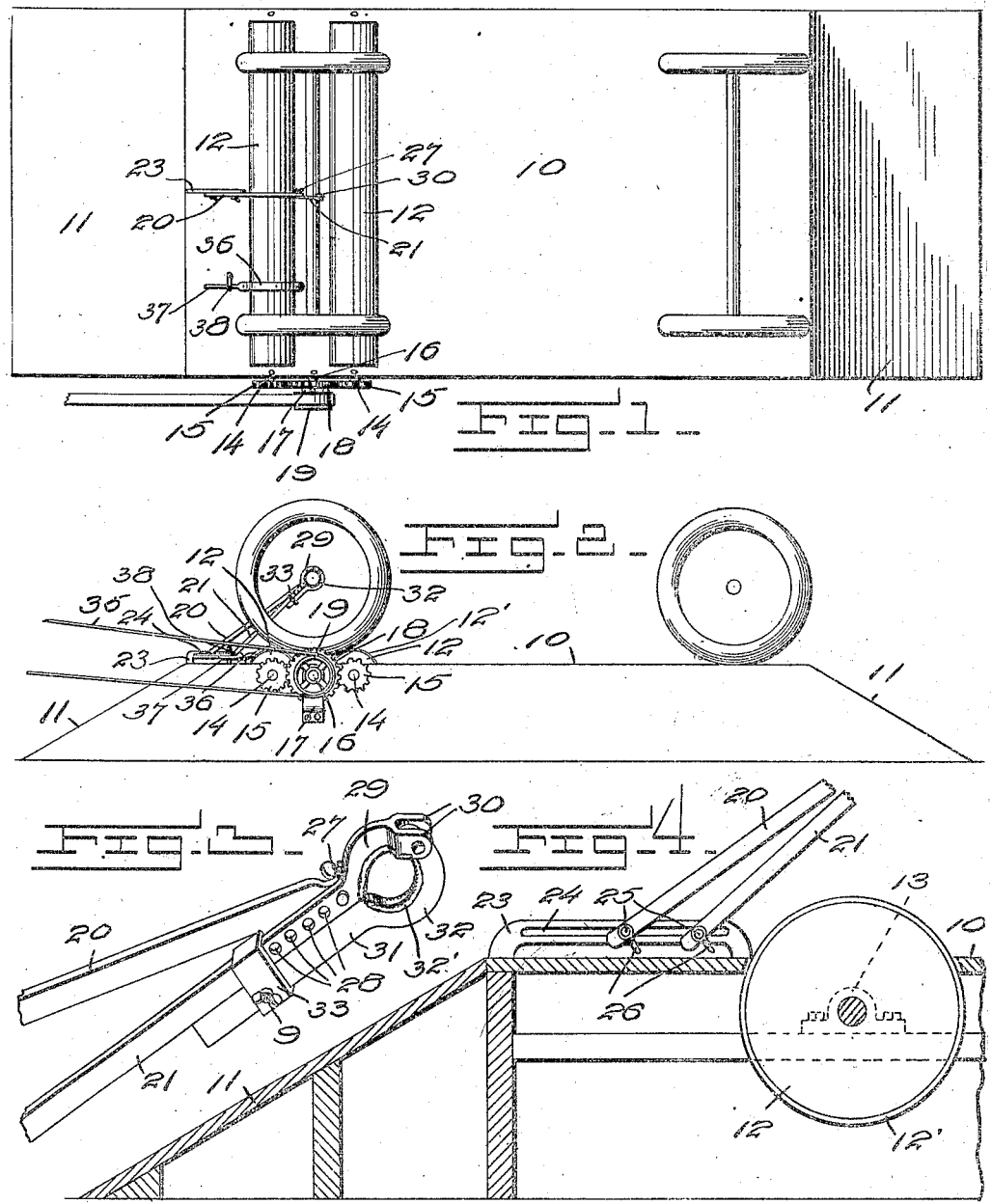

UNITED STATES PATENT OFFICE.

CLIFFORD A. WOODS, OF PLANKINTON, SOUTH DAKOTA.

AUTOMOBILE POWER-MOTOR.

1,003,567. Specification of Letters Patent. Patented Sept. 19, 1911.

Application filed November 27, 1909. Serial No. 530,248.

*To all whom it may concern:*

Be it known that I, CLIFFORD A. WOODS, a citizen of the United States, residing at Plankinton, in the county of Aurora and State of South Dakota, have invented an Automobile Power-Motor, of which the following is a specification.

This invention relates to an automobile power motor which is designed to transmit power from the drive wheels of the automobile to miscellaneous machinery, whereby the same may be adapted for numerous uses when not upon the road.

The invention is particularly adapted for use in rural districts wherein the drive wheels when rotated by the motor of the vehicle may be properly held in position to transmit power for operating corn shellers, cream separators, fanning mills and numerous other machinery.

A further object is to provide means for holding the automobile in a proper position for actuation of the power motor.

Other objects and advantages will be apparent from the following description, and it will be understood that changes in the specific structure shown and described may be made within the scope of the claims without departing from the spirit of the invention.

In the drawings: Figure 1 is a top plan view of the device, Fig. 2 is a side elevation thereof, Fig. 3 is a perspective view of a portion of the axle clamp on an enlarged scale, Fig. 4 is a longitudinal sectional view of a portion of the device.

Referring to the drawings in which similar characters refer to like parts throughout the several views, I have shown a platform having a horizontal surface 10 and suitably inclined approaches 11 at each end thereof, said platform constituting the framework of the machine. A pair of drums 12 of proper size and having rubber covered surfaces 12' are rotatably journaled in automatically oiled bearings 13 supported upon the framework, and said drums are spaced a proper distance apart to allow the drive wheels of various makes of automobiles to have correct bearing thereon, so as to properly engage both of the drums without engaging the horizontal surface 10 of the platform. It will also be noted in the drawings that the drums are rotatable within the platform and project a proper distance above the horizontal surface 10 to permit such engagement of the drive wheels. The shafts 14 to which the drums are rigidly secured are projected through one side of the platform and have gear wheels 15 keyed thereon. A shaft 16 is rotatably carried by the frame structure intermediately between the gear wheels 15, and the bearing bracket 17 is secured to one side of the platform to form a proper bearing for an extension of the shaft 16. A larger gear wheel 18 is disposed in mesh with the smaller gear wheels 15 inwardly of the bearing bracket 17, and a belt pulley 19 is keyed to the outer end of the shaft 16 for operative connection by a suitable endless belt to convey power to the machine desired to be operated. The gear wheel 18 and the pulley 19 are each provided with automatically oiled bearings, one of which is disposed upon the inside of the gear wheel and bolted to the platform, and the other is secured to the bracket 17 between said gear wheel and pulley to insure strength. As will also be noted, in Fig. 2 of the drawings, the bearing bracket 17 is secured to the frame below the larger gear wheel 18 and is offset in order to properly position the same between the gear wheel and pulley for rotatably supporting the shaft 16.

In order to rigidly hold the automobile in position so that the drive wheels thereof will properly engage the drums, I provide an adjustable brace which is adapted to be secured to the drive axle of the vehicle to hold the same in a rigid position. This brace comprises a pair of divergent arms 20 and 21, which have their lower ends connected to a brace rod 23 disposed parallel with the horizontal portion 10 and secured to the portion 10 centrally of the width of the platform. This brace rod 23 is provided with a longitudinal slot 24, and bolts 25 carried by the lower ends of the arms 20 and 21 are disposed therethrough for sliding movement and are adapted to be held in their adjusted position by means of lever nuts 26 threaded thereon, so as to frictionally bind the parts together.

As will be more especially noted in Fig. 3 of the drawings, the upper end of the arm 20 is secured to the arm 21 by a bolt and nut connection 27 and said arm 21 is provided with a series of openings 28 whereby engagement may be changed to different positions, to regulate the height of the arm from the platform, so that the clamp carried thereby, and to be subsequently described, may be disposed in the proper position to be secured to the drive axle of the vehicle and thereby permit the use of automobiles having drive wheels of different diameters, so that said wheels will always engage the drums in a proper manner.

The upper end of the arm 21 is curved as shown at 29 and terminates in a forked end providing bifurcated arms 30 having openings therethrough. A clamp arm 31 having a curved upper end 32 is pivotally connected through the medium of a bolt extended through the openings in the arm 30 and both of said portions 29 and 32 are provided with a rubber covering 32' to prevent destruction of the axle or casing thereof, and a clevis 33 is slidably mounted upon the arm 21 and adapted to be moved over the clamp arm 31 to hold the curved portions in binding contact with the axle, and a set screw 9 is disposed through the clevis for holding the same in position.

The inclined approaches 11 are of the proper slope to enable the automobile to be driven on to the platform and when the drive wheels are positioned between the two drums, the supporting arm just described is attached to the axle of the vehicle in a proper position to engage the said wheels with the drums at the proper pressure to insure rotation of the drums. The device may then be operated and power conveyed through the gears and belt pulley 19 through a suitable belt 35 to the machine desired to be driven and when it is desired to cease operation thereof, the clamp is removed from the axle and the drums are held from rotation by means of a brake 36, which comprises a flat strip of metal of sufficient strength and stiffness and which is bolted to the horizontal portion 10 of the platform and extended around the drum over which the axle clamp is extended and is provided with a horizontally disposed handle portion 37 which is adapted to engage a vertical ratchet bar 38 also secured to the platform, so that the ratchet may be held in binding contact with the drum to prevent movement of the parts of the motor and hold the drums in a stationary position so that the automobile may be driven on and off of the platform. It is also apparent that by sliding the two arms 20 and 21 upon the brace rod 23, the axle clamp may be adjusted vertically to permit its use in connection with different makes of automobiles, and by mounting the structure upon the platform, the device is rendered portable, so that it may be conveyed from place to place and for use as desired. The provision of the drums which extend the full width of the platform makes it much easier to properly position the automobile for operation and by covering the same with rubber, a more positive drive is insured.

Having thus described my invention, what I claim is:

1. An automobile power motor comprising a platform having inclined approaches to permit the conveyance of the automobile thereon, friction drums rotatably carried by the platform and projecting thereabove, rotatable means operatively connected with the drums for transmitting power, and an adjustable brace adapted for engagement with the drive axle of the automobile to position the drive wheels in engagement with the drums, said brace comprising a slotted rod carried by the platform, a pair of divergent arms slidably engaged with the slot and adjustably secured together at their upper ends and a clamp carried by one of the arms for engagement with the axle.

2. In a motor for deriving power from the drive wheels of a vehicle; of a pair of drums provided with operative connections for transmitting power from their rotation, said drums being spaced apart for engagement with said wheels and means for holding the latter in such position, said means comprising a pair of divergent arms adjustably secured together at their upper ends, means for securing the lower ends of the arms for independent slidable movement to position the arms centrally between the drums, a clamp pivotally secured to the upper end of one of the arms, said parts having curved portions adapted to engage the axle of the vehicle and slidable means carried by the last mentioned arm to hold the clamp in an engaged position.

3. The combination with a support for a motor vehicle, a power transmitting driving means, the wheels of said vehicle adapted for contact with said power transmitting means, a slotted bracket on the support, a pair of arms slidably adjustable in said slotted bracket, one end of one of said arms being formed with a curved jaw, a shorter arm having a curved jaw pivotally connected to said curved jaw, said curved jaws adapted for clamping engagement with the rear axle of said vehicle, and means on one of said adjustable arms and said shorter arm for adjusting said arms.

CLIFFORD A. WOODS.

Witnesses:
   W. T. Lathrop,
   W. C. Woods.